United States Patent Office 3,234,210
Patented Feb. 8, 1966

3,234,210
NEW UREAS AND PROCESS FOR
PREPARING SAME
Paul Schmidt, Therwil, and Max Wilhelm and Kurt
Eichenberger, Basel, Switzerland, assignors to Ciba
Corporation, a corporation of Delaware
No Drawing. Filed Aug. 4, 1960, Ser. No. 47,373
Claims priority, application Switzerland, Aug. 13, 1959,
76,915/59; Mar. 25, 1960, 3,373/60; July 8, 1960,
7,837/60
14 Claims. (Cl. 260—239)

The present invention provides new sulfonyl-ureas of the formula $$R_1-SO_2-NH-CO-NH-R_2$$

in which $R_1$ stands for an amino group disubstituted by lower aliphatic hydrocarbon radicals whose carbon chain may be interrupted by hetero atoms such as oxygen, nitrogen or sulfur, and $R_2$ for a lower hydrocarbon radical or oxa-hydrocarbon radical—and of their salts with bases, more especially salts with metals of groups 1 or 2 of the Periodic System, above all their alkali metal salts and alkaline earth metal salts.

Lower aliphatic hydrocarbon radicals are, above all, alkyl, alkenyl, alkylene, cycloalkyl, cycloalkenyl, cycloalkyl-alkyl, cycloalkenyl-alkyl radicals which may contain further hydrocarbon radicals, such as alkyl groups or if desired fused on benzene radicals. Radicals of this kind interrupted by hetero atoms are, for example, oxa-alkyl or oxa-alkylene radicals. Advantageously, these radicals contain 1 to 10 carbon atoms. As examples, may be mentioned: methyl, ethyl, propyl, isopropyl, straight-chain or branched radicals linked in any desired position, such as butyl, pentyl, hexyl or heptyl radicals, allyl, methallyl, cyclopentyl, cyclohexyl, cyclopentenyl, cyclohexenyl, cyclopentyl-methyl, oxa-cyclopentylmethyl, such as 2-oxa-cyclopentyl-(1)-methyl, cyclohexylmethyl, methyl-cyclohexyl, cyclohexylethyl, cyclohexenyl-ethyl, butylene-(1:4), pentylene-(1:5), hexylene-(1:6), hexylene-(2:5), heptylene-(2:6), 3-oxa-pentylene-(1:5), 3-oxa-butyl, 3-oxa-pentyl, 1:2 - benzopentylene-(1:5), 2:3-benzopentylene-(1:5), and similar radicals.

The lower hydrocarbon radical or oxa-hydrocarbon radical $R_2$ likewise contains advantageously 1 to 10 carbon atoms and is, above all, an alkyl, oxa-alkyl, alkenyl, alkinyl, cycloalkyl, cycloalkenyl, cycloalkyl-alkyl, cycloalkenyl-alkyl, phenyl-alkyl radical, and these radicals may contain further hydrocarbon radicals such, for example, as alkyl groups. As examples may be mentioned: methyl, ethyl, propyl, isopropyl, straight-chain or branched radicals linked together in any desired position, such as butyl, pentyl, hexyl or heptyl radicals, allyl, methallyl, cyclopentyl, cyclohexyl, cyclopentenyl, cyclohexenyl, cyclopentylmethyl, oxa-cyclopentylmethyl, such as cyclohexylmethyl, methyl-cyclohexyl, cyclohexylmethyl, cyclohexenyl-ethyl, 3-oxa-butyl, 3-oxa-pentyl, benzyl or phenylethyl radicals in which the phenyl group may contain, for example halogen atoms, such as fluorine, chlorine, bromine, trifluoromethyl, or lower alkyl, alkoxy or alkyl-mercapto groups in which the alkyl groups contain, for example 1 to 3 carbon atoms.

The new compounds possess valuable pharmacological properties. Inter alia, they reduce the blood sugar level and are, therefore, intended to be used as antidiabetic medicaments.

Particularly valuable in this respect are the compounds of the formula

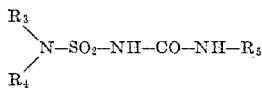

and their salts, in which formula $R_3$ and $R_4$ stands for lower alkyl radicals containing 1 to 4 carbon atoms each, or $R_3$ and $R_4$ together represent a straight-chain or branched alkylene or oxa-alkylene radical containing 4 to 8 carbon atoms, such as butylene-(1:4), pentylene-(1:5), hexylene-(1:6), hexylene-(2:5), heptylene-(2:6) or 3-oxa-pentylene-(1:5), and $R_5$ stands for an alkyl radical containing 1 to 8 carbon atoms, a phenylethyl radical or a cycloalkyl radical.

A special object of the present invention are the compounds, having an especially good blood sugar lowering action, of the formula $$R_6-SO_2-NH-CO-NH-R_7$$

and their salts, in which formula $R_6$ stands for a pyrrolidino, piperidino or morpholino radical and $R_7$ for a cyclopentyl, cyclohexyl or phenylethyl radical, above all the N-(piperidino-sulfonyl)-N'-cyclohexyl urea of the formula

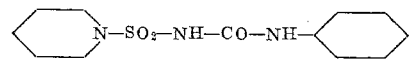

and its salts, and also N-(morpholino-sulfonyl)-N'-($\beta$-phenyl-ethyl)-urea and its salts.

The new compounds are made by processes as such known. Preferably, a compound each of the formulae $$R_1-SO_2-NH_2 \text{ and } OCN-R_2$$

$R_1$ and $R_2$ have the meaning given above.

The afore-mentioned process is carried out in the conventional manner, in the presence or absence of a diluent and/or condensing agent, at a low, ordinary or elevated temperature, if desired under superatmospheric pressure.

According to a preferred variant of the process the sulfonamide of the formula $R_1-SO_2-NH_2$ dissolved in an organic solvent such as acetone, advantageously in the presence of an alkali hydroxide or carbonate is reacted with an isocyanate of the formula $OCN-R_2$.

The starting materials are known or can be made by as such known methods. Preferred starting materials are those which yield the final products designated above as particularly valuable.

Depending on the reaction conditions employed, the new compounds are obtained in the free form or as salts. Salts thus obtained can be converted into the free compounds in the usual manner, for example by acidification. The free compounds can be converted into salts thereof, such as salts with bases, for example ammonia or organic bases, and more especially into the afore-mentioned metal salts, for example those of sodium, potassium, calcium or magnesium.

The new compounds and salts thereof can be used for example in the form of pharmaceutical preparations, which contain them in admixture with a pharmaceutical organic or inorganic carrier suitable for enteral or parenteral administration. As carriers such substances may be employed as do not react with the new compounds, such as water, gelatine, lactose, starches, magnesium stearate, talc, vegetable oils, benzyl alcohols, gums, polyalkylene glycols, white petroleum jelly, cholesterol or any other known carrier for medicaments. The pharmaceutical preparations may be in the form, for example, of tablets, dragees, powder or suppositories or in liquid form as solutions, suspensions or emulsions.

The following examples illustrate the invention.

Example 1

A mixture of 6 grams of piperidino sulfonamide, 5 grams of potassium carbonate and 75 cc. of acetone is boiled for 1 hour. 6 grams of n-butyl isocyanate are then added, and the whole is heated for 4 hours at 60°.

The reaction mixture is then evaporated, the residue is treated with 2 N-sodium hydroxide solution, and the undissolved matter is filtered off. Acidification of the filtrate causes the N-(piperidino-sulfonyl)-N'-n-butylurea of the formula

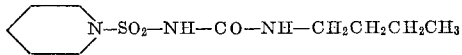

to separate out in crystalline form. Upon recrystallization from methylene chloride+petroleum ether it melts at 111–112° C.

*Example 2*

A solution of 10 grams of piperidino sulfonamide in 100 cc. of acetone is stirred with 9 grams of potassium carbonate for 1 hour at the boil. 9 grams of ethyl isocyanate are then added, and the mixture is heated for 2 hours at 50°. The reaction mixture is evaporated to dryness in vacuo, and the residue is treated with 100 cc. of 2 N-sodium hydroxide solution. The precipitate is filtered off, and the filtrate is treated with 2 N-hydrochloric acid to reach a pH of 1 to 2. The crystalline precipitate thus formed is the N-(piperidino-sulfonyl)-N'-ethyl-urea of the formula

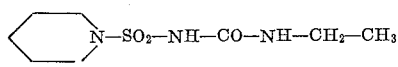

which, after recrystallization from water, melts at 134–136° C.

*Example 3*

A solution of 6 grams of piperidino sulfonamide in 75 cc. of acetone is stirred for 1 hour at the boil with 5 grams of finely powdered potassium carbonate. 10 grams of cyclohexyl isocyanate are then added, and the whole is heated for 4 hours at 60° C. The reaction mixture is evaporated to dryness, the residue is treated with 100 cc. of 2 N-sodium hydroxide solution, and the precipitate formed is filtered off. On acidifying the filtrate with 2 N-hydrochloric acid, N-(piperidino-sulfonyl)-N'-cyclohexyl-urea of the formula

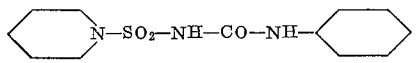

is obtained in crystalline form. After having been recrystallized from petroleum ether it melts at 141–143° C.

*Example 4*

A solution of 8 grams of piperidino sulfonamide in 75 cc. of acetone is stirred for 1 hour at the boil with 5 grams of finely powdered potassium carbonate. 10 grams of β-phenylethyl isocyanate are then added, and the mixture is heated for 4 hours at 60° C. The reaction mixture is evaporated to dryness, the residue is treated with 100 cc. of 2 N-sodium hydroxide solution, and the precipitate formed is filtered off. When the filtrate is acidified with 2 N-hydrochloric acid, the N-(piperidino-sulfonyl)-N'-(β-phenylethyl)-urea of the formula

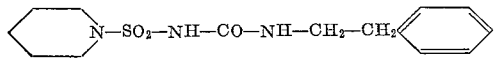

separates out as a viscid oil which crystallizes after standing for some time. After recrystallization from ethanol, it melts at 136–138° C.

*Example 5*

A solution of 8 grams of piperidino sulfonamide in 75 cc. of acetone is boiled for 1 hour with 5 grams of potassium carbonate. 10 grams of 2:4-dimethyl-pentyl-(3)-isocyanate are added and the whole is heated for 4 hours at 60° C. The reaction mixture is then evaporated to dryness, the residue is treated witth 100 cc. of 2 N-sodium hydroxide solution, and the precipitate formed is filtered off. When the filtrate is acidified with 2 N-hydrochloric acid, the N-(piperidino-sulfonyl) - N' - [2:4 - dimethylpentyl-(3)]-urea of the formula

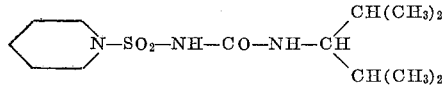

separates out in crystalline form. After recrystallization from alcohol it melts at 156–157° C.

*Example 6*

5 g. of n-butyl isocyanate in 25 cc. of acetone are added dropwise to a solution of 9 g. of morpholino-sulfamide in 50 cc. of acetone and 25 cc. of 2 N-sodium hydroxide solution, and the whole is stirred for 3 hours at room temperature. The reaction mixture is heated at 50° C. for 1 hour, and the excess acetone then evaporated. The residue is acidified with 100 cc. of 2 N-hydrochloric acid after which an oil separates and which solidifies after standing for some time. On recrystallization from a mixture of chloroform and petroleum ether there is obtained the N-(morpholino-sulfonyl)-N'-N-butyl-urea of the formula

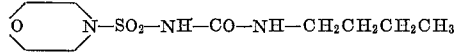

in the form of crystals melting at 116–118° C.

*Example 7*

A solution of 9 g. of morpholino sulfamide in 75 cc. of acetone is stirred for 1 hour at the boil with 5 g. of finely powdered potassium carbonate. 9 g. of cyclohexyl isocyanate are then added, and the whole is heated for 4 hours at 60° C. The reaction mixture is evaporated to dryness under reduced pressure, and the residue is mixed with 100 cc. of 2 N-sodium hydroxide solution. Insoluble constituents are filtered off and the filtrate acidified with 2 N-hydrochloric acid. The N-(morpholino-sulfonyl)-N'-cyclohexyl-urea of the formula

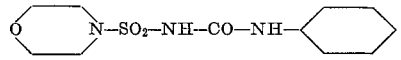

separates out and after recrystallization from ethanol it melts at 151° C.

*Example 8*

A solution of 9 g. of morpholino sulfamide in 75 cc. of acetone is boiled and stirred for 1 hour with 5 g. of finely powdered potassium carbonate. 10 g. of β-phenylethyl isocyanate in 25 cc. of acetone are then added, and the whole heated at 60° C. for 4 hours. The reaction mixture is evaporated to dryness, the residue mixed with 100 cc. of 2 N-sodium hydroxide solution and filtered. On acidification of the filtrate, the n-(morpholino-sulfonyl)-N'-(β-phenylethyl)-urea of the formula

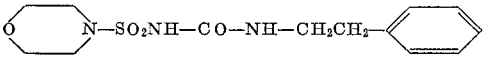

separates out in the form of crystals. After recrystallization from ethanol the compound melts at 142° C.

*Example 9*

8 g. of ethyl isocyanate in 25 cc. of acetone are added to a solution of 12 g. of pyrrolidino sulfamide in 100 cc. of acetone and 50 cc. of 2 N-sodium hydroxide solution. The mixture is stirred for 3 hours at room temperature and 1 hour at 50° C. and then evaporated under reduced pressure. The residue is dissolved in 100 cc. of 2 N-sodium hydroxide solution, filtered to eliminate insoluble constituents, and the filtrate given a pH of 1–2 with 2 N-hydrochloric acid. The precipitate which forms is recrystallized from a mixture of methylene chloride and petroleum ether. There is obtained the N-(pyrrolidino-sulfonyl)-N'-ethyl-urea of the formula

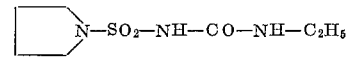

in the form of crystals of melting point 139–140° C.

The pyrrolidino sulfamide used as starting material is prepared as follows:

30 g. of pyrrolidine and 30 g. of sulfamide are heated at 90–100° C. for 4 hours. After cooling, 300 cc. of 2 N-hydrochloric acid are added, and the precipitate which forms is filtered off. There is obtained in this manner pyrrolidino sulfamide of the formula

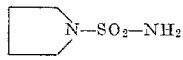

which after being recrystallized from ethanol melts at 94–95° C.

Example 10

12 g. of cyclohexyl isocyanate in 25 cc. of acetone are added to a solution of 12 g. of pyrrolidino sulfamide in 100 cc. of acetone and 50 cc. of 2 N-sodium hydroxide solution. The mixture is stirred at room temperature for 3 hours and at 50° C. for 1 hour. The acetone is evaporated and the residue treated with 50 cc. of 2 N-sodium hydroxide solution, the whole is filtered, and the filtrate given a pH of 1–2 with 2 N-hydrochloric acid. A precipitate forms which is recrystallized from a mixture of chloroform and petroleum ether. There is obtained the N-(pyrrolidino-sulfonyl)-N'-cyclohexyl-urea of the formula

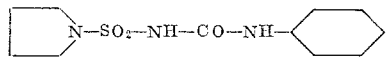

in the form of crystals melting at 188–189° C.

Example 11

10 g. of N,N-di-n-propyl sulfamide are boiled for 1 hour in 100 cc. of acetone with 5 g. of finely powdered potassium carbonate. There are then added 10 g. of β-phenylethyl isocyanate, and the mixture is heated at 40° C. for 6 hours. The reaction mixture is evaporated and the residue mixed with 100 cc. of 2 N-sodium hydroxide solution, and undissolved matter filtered off. On acidification of the filtrate with concentrated hydrochloric acid the N-(di-n-propylamino-sulfonyl)-n'-(β-phenylethyl)-urea of the formula

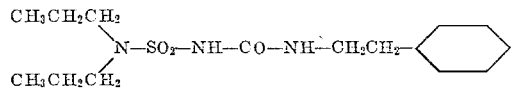

separates out in the form of crystals. After being recrystallized from the mixture of chloroform and petroleum ether, the compound melts at 101–103° C.

The di-n-propyl sulfamide used as starting material can be prepared in this manner:

50 g. of sulfamide and 100 cc. of di-n-propylamine are stirred at 120° C. for 10 hours. After cooling, 500 cc. of 2 N-hydrochloric acid are added, and the precipitate is filtered off. On recrystallization from a mixture of chloroform and petroleum ether there is obtained the di-n-propyl sulfamide of the formula

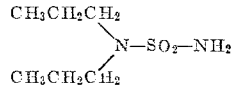

in the form of crystals melting at 68° C.

Example 12

A solution of 15 g. of N,N-di-propyl sulfamide in 75 cc. of acetone is stirred with 5 g. of finely powdered potassium carbonate for 1 hour at the boil. There are then added 10 g. of cyclohexyl isocyanate and the whole is refluxed for 3 hours. The reaction mixture is evaporated to dryness, treated with 75 cc. of 2 N-sodium hydroxide solution and filtered while warm. On acidification of the filtrate with concentrated hydrochloric acid a precipitate is formed which is recrystallized from ethanol. There is obtained in this manner the N-(di-n-propylamino-sulfonyl)-N'-cyclohexyl-urea of the formula

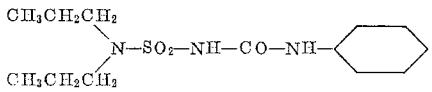

in the form of white crystals of melting point 123–125° C.

Example 13

A solution of 10 g. of hexamethylene-imino-sulfamide in 150 cc. of acetone is stirred with 5 g. of finely powdered potassium carbonate at the boil for 1 hour. There are then added 9 g. of cyclohexyl isocyanate, and the mixture is heated at 50° C. for 2 hours. The reaction mixture is evaporated to dryness under reduced pressure, and the residue is treated with 100 cc. of 2 N-sodium hydroxide solution. Undissolved matter is filtered off and the filtrate treated with 2 N-hydrochloric acid to achieve a pH of 1–2. N-(hexamethylene-imino-sulfonyl)-N'-cyclohexyl-urea of the formula

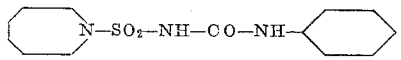

precipitates. After recrystallization from ethanol it melts at 167–168° C.

The hexamethylene-imino-sulfamide used as starting material is prepared as follows:

25 g. of hexamethylene-imine and 20 g. of sulfamide are stirred at 100° C. for 4 hours. There are then added 300 cc. of 2 N-hydrochloric acid, and the resulting precipitate is filtered off to obtain hexamethylene-imino-sulfamide of the formula

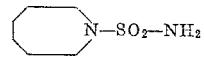

which after being recrystallized from a mixture of chloroform and petroleum ether melts at 66–68° C.

Example 14

To a solution of 11 g. of 1,2,3,4-tetrahydroisoquinolino-sulfamide in 25 cc. of 2 N-soduim hydroxide solution and 50 cc. of acetone are added 5 g. of n-butyl isocyanate in 50 cc. of acetone, and the whole is stirred at room temperature for 3 hours and at 50° C. for 1 hour. The acetone is then evaporated under a water-jet vacuum. The residue is treated with 50 cc. of 2 N-soduim hydroxide solution, filtered, and the filtrate acidified with 2-N-hydrochloric acid. A precipitate of N-(1,2,3,4-tetrahydro-isoquinolino-sulfonyl)-N'-n-butylurea of the formula

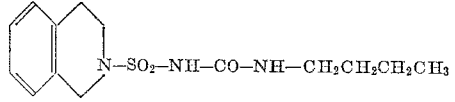

forms which after being recrystallized from a mixture of chloroform and petroleum ether melts at 115–117° C.

The 1,2,3,4-tetrahydro-isoquinolino-sulfamide used as starting material is prepared as follows:

30 g. of 1,2,3,4-tetrahydro-isoquinoline and 30 g. of sulfamide are heated at 120° C. for 4 hours. After cooling, 300 cc. of 2 N-hydrochloric acid are added, and the resulting precipitate is recrystallized from ethanol. There is obtained the 1,2,3,4-tetrahydroisoquinolino-sulfamide of the formula

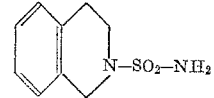

in the form of crystals melting at 157° C.

Example 15

A solution of 10 grams of morpholino sulfamide in 100 cc. of acetone is boiled for 1 hour with stirring with 5 grams of finely powdered potassium carbonate. 7 grams of isobutylisocyanate in 25 cc. of acetone are then added and the whole stirred for 3 hours at 50° C. The reaction mixture is evaporated to dryness, treated with 100 cc. of 2 N-sodium hydroxide solution, whereupon the precipitate is filtered off. On acidifying the filtrate, N-(morpholino-sulfonyl)-N'-isobutylurea of the formula

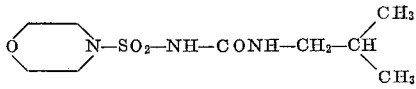

separates in the form of white crystals. After recrystallization from a mixture of ethanol and water the compound melts at 170–171° C.

*Example 16*

10 grams of morpholino sulfamide are boiled for 1 hour with 5 grams of potassium carbonate in 75 cc. of acetone. 10 grams of benzyl-isocyanate are then added and the whole heated for 6 hours at 60° C. The residue remaining on evaporating the reaction mixture is treated with 2 N sodium hydroxide solution and the undissolved constituents are filtered off. On acidifying the filtrate with hydrochloric acid, N-(morpholino-sulfonyl)-N'-benzyl-urea of the formula

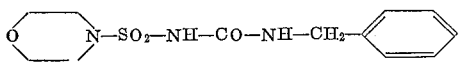

separates in the form of crystals. After recrystallization from alcohol the compound melts at 184–185° C.

What is claimed is:
1. N-(piperidino-sulfonyl)-N'-cyclohexyl-urea.
2. N-(piperidino-sulfonyl)-N'-ethyl-urea.
3. N-(piperidino-sulfonyl)-N'-(β-phenyl-ethyl)-urea.
4. N-(morpholino-sulfonyl)-N'-n-butyl-urea.
5. N-(morpholino-sulfonyl)-N'-cyclo-hexyl-urea.
6. N-(morpholino-sulfonyl)-N'-(β-phenyl-ethyl)-urea.
7. N-(1-pyrrolidino-sulfonyl)-N'-ethyl-urea.
8. N-(1-pyrrolidino-sulfonyl)-N'-cyclohexyl-urea.
9. N-(di-n-propylamino-sulfonyl)-N'-cyclohexylurea.
10. N-(hexamethyleneimino-sulfonyl) - N'-cyclohexyl-urea.
11. N-(1:2:3:4-tetrahydro-isoquinolino - sulfonyl)-N'-n-butyl-urea.
12. N-(morpholino-sulfonyl)-N'-isobutylurea.
13. A member selected from the group consisting of sulfonyl ureas of the formula

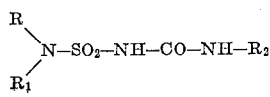

wherein R and $R_1$ each stands for lower alkyl, and $R_2$ stands for a member selected from the group consisting of cyclo-lower alkyl and phenyl-lower alkyl, and their salts with metals selected from the group consisting of those of Group I and Group II of the Periodic System.

14. Sulfonyl ureas of the formula

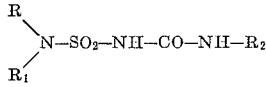

in which the R and $R_1$ substituents, taken together, stand for a member selected from the group consisting of lower alkylene, benzo-lower alkylene and 3-oxapentylene, and $R_2$ stands for a member selected from the group consisting of lower alkyl, cyclo-lower alkyl and phenyl-lower alkyl, and their salts with metals selected from the group consisting of those of Group I and Group III of the Periodic System.

References Cited by the Examiner

UNITED STATES PATENTS

| | | | |
|---|---|---|---|
| 2,079,541 | 5/1937 | Battegay | 260—556 |
| 2,390,253 | 12/1945 | Henke | 260—553 |
| 2,527,861 | 10/1950 | Walter | 260—556 |
| 2,968,158 | 1/1961 | Ruschig et al. | 260—553 |
| 3,108,098 | 10/1963 | McManus | 260—553 X |

FOREIGN PATENTS

| | | |
|---|---|---|
| 993,465 | 7/1951 | France. |
| 859,156 | 12/1952 | Germany. |
| 890,883 | 9/1953 | Germany. |

OTHER REFERENCES

Appel et al.: Chemische Berichte, vol. 91, pp. 1195–1200 (1958).

Bergmann: The Chemistry of Acetylene and Related Compounds, p. 80 (1948).

German Auslegeschrift 1,064,284, Aug. 27, 1959.

Hokefelt et al.: J. Med. & Pharm. Chem., vol. No. 2, pages 231–239 (1962).

Paquin: Kunststoffe, vol. 37, pages 165–167 and 169–170 (1947).

Petersen, Ber. Deut. Chem., vol. 83, pages 551–558 (1950).

Ruschig et al.: Arzn. Forsch. vol. 8, No. 7a, pp. 448–454 (1958).

Wood et al.: J. Soc. Chem. Ind., vol. 5a, pages 346–349t.

WALTER A. MODANCE, *Primary Examiner.*

IRVING MARCUS, JOHN D. RANDOLPH, *Examiners.*